L. WILSON.
MUD GUARD SUPPORT.
APPLICATION FILED SEPT. 14, 1912.
1,069,506.
Patented Aug. 5, 1913.
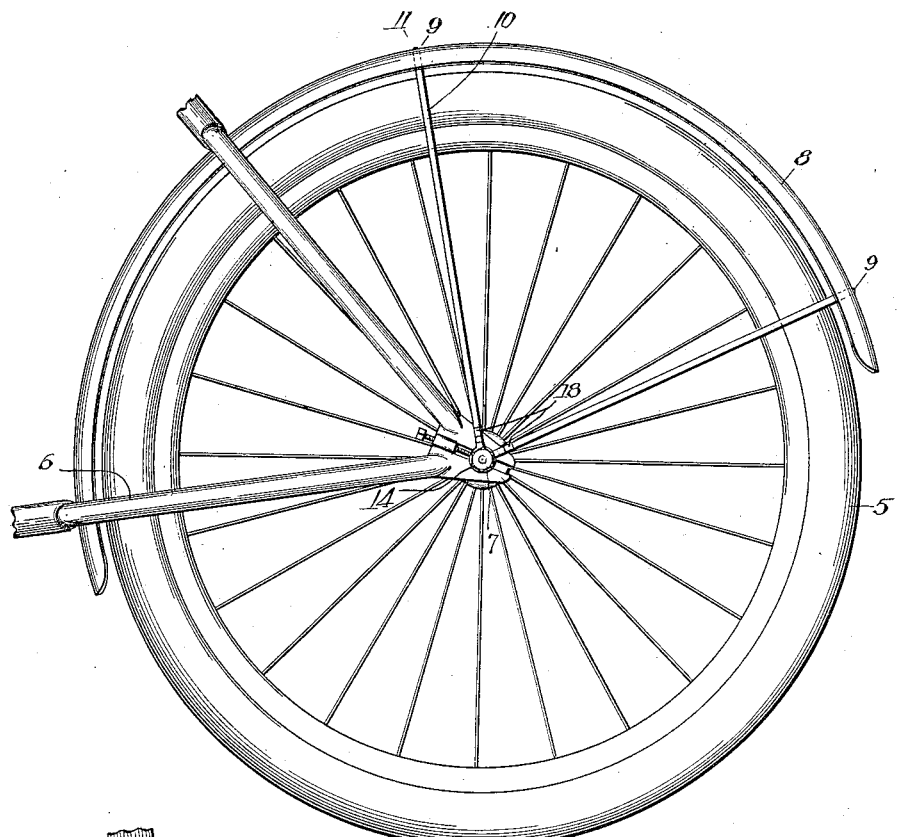
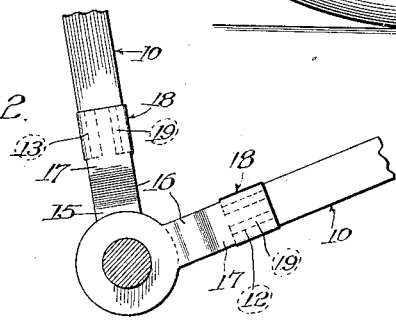
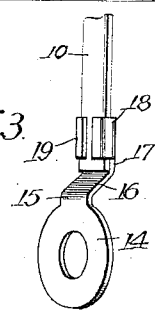
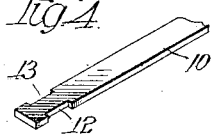
Witnesses:
Robert F. Weir
Arthur Franke
Inventor:
Luloff Wilson
by Josée Bain May
Attys.
COLUMBIA PLANOGRAPH CO., WASHINGTON, D. C.

UNITED STATES PATENT OFFICE.

LULOFF WILSON, OF CHICAGO, ILLINOIS.

MUD-GUARD SUPPORT.

1,069,506.

Specification of Letters Patent.

Patented Aug. 5, 1913.

Application filed September 14, 1912. Serial No. 720,318.

*To all whom it may concern:*

Be it known that I, LULOFF WILSON, a citizen of the United States, residing at Chicago, in the county of Cook and State of Illinois, have invented certain new and useful Improvements in Mud-Guard Supports, of which the following is a specification.

My invention relates to improvements in mud-guard supports and more particularly to brackets whereby the mud-guard may be supported in proper position with respect to the wheel of a bicycle, motorcycle, or the like, irrespective of the shape, or of the attaching perforations, of the particular guard.

Mud-guards for bicycles are ordinarily supplied to the user already perforated for a series of screws by means of which the guard is secured to the brackets, the brackets of course being secured to the axle of the wheel. In this arrangement, it is obvious that the angle lying between any two guard-supporting rods will be determined by the distance between any two perforations on the guard.

One of the objects of my invention is to provide a bracket construction adapted to be applied to the wheel irrespective of the original perforations in the mud-guard, so that the expense and trouble of applying the mud-guard may be reduced to a minimum by making additional perforation unnecessary no matter what the original perforation may have been.

Another object of my invention is to provide a bracket having the above mentioned feature of adaptability to any mud-guard and being also advantageous in structure so that it may be easily and cheaply made, and may be strong and durable in use.

In the drawings, wherein I have shown an embodiment of my invention, Figure 1 is a side elevation of a bicycle wheel showing a guard mounted thereon by the use of two of my brackets; Fig. 2 is an enlarged section of the wheel axle showing fragments of the bracket; Fig. 3 is an isometric detail of the axle engaging end of the bracket; and Fig. 4 is a fragmentary detail.

In the drawings, 5 indicates a bicycle wheel mounted as usual upon the frame 6 by means of nuts 7, and 8 indicates the mud-guard, of usual construction, having perforations 9—9.

Each of the brackets includes in its structure a long, preferably flat, rod 10 bent to extend from a point near the axle of the wheel upon one side thereof, over the tire of the wheel, suitably spaced therefrom, to a similar point upon the other side of the wheel, the apex or the extreme bent portion of the rod, having a screw-threaded perforation into which a screw 11 may be inserted to secure the guard and bracket together as shown in the drawings. Each end of the rod is preferably square and slightly above the end is provided upon its edges with suitable cut-away portions 12 and 13. In combination with each end of the rod 10, I provide an axle engaging collar 14 having an arm 15 extending from one side thereof and lying partly in the plane of the collar 14. Beyond said portion of the arm 15 which lies in the plane of the collar 14, the arm is deflected laterally as at 16 and again deflected as at 17 to lie in a plane parallel with the plane of the collar 14. In said portion 17, I provide oppositely extending ears 18 and 19 of width equal to the width of the cut-away portions 12 and 13 of the rod 10, and spaced from the bend between the portions 16 and 17 a distance equal to the distance between the squared end of the rod 10 and the cut-away portion 12 and 13. Two parts as thus constructed may now be joined as shown in Fig. 3 with the ears 18 and 19 bent around the rod 10 at the cut-away portion 12 and 13, and in this position the squared end of the rod 10 engages in the bend between portions 16 and 17 of the collar-arm 15. This makes a cheap, rigid, and durable construction for the guard-supporting bracket, and besides having the advantages of structure apparent from a consideration of Figs. 3 and 4, it will be seen to have other advantages some of which will appear from the description of the use of a bracket as thus constructed.

In applying a mud-guard to a bicycle wheel by the use of my brackets, the nuts 7 are removed from the rear axle and a suitable number of brackets, determined by the number of perforations 9 in the guard, usually two, are placed with their collars 14 engaging over the axle. The nuts 7 are then replaced and tightened enough to retain the collars 14 upon the axle but to permit the rods 10 to be pivotally moved upon the axle until the screw-threaded perforations in the rods 10 register with the perforations 9 in the guard, when screws 11 may be used to connect the guard and rod 10. The nuts 7 may now be further tightened and the bicycle will be ready for use with the guard 8 suitably mounted thereon. In this arrangement, it will be seen that the deflected portions 16 of the collar-arm 15 places the rod 10 in suitable relation with respect to the wheel and that when the bracket is mounted upon the axle as described it may be moved to any position to accommodate it to the particular guard desired to be mounted upon the wheel so that with my bracket substantially any guard may be used on a bicycle wheel.

What I claim is:

1. In a device of the character described, a plurality of wheel-overlying rods, the end of each said rod being suitably shaped for engagement of an axle-surrounding collar, a collar for each said end suitably engaging the same, and means of engagement between the apex of each said wheel-overlying rod and a mud-guard, whereby each said rod may be moved independently of any other according to the requirement of the guard.

2. In a device of the character described, a wheel-overlying rod, having near each end cut-away portions, axle-engaging collars each provided with an arm, said arm having integral ears, said ears bent around the rod within said cut-away portions, and means at the apex of said wheel-overlying rod for engagement of a mud-guard.

3. In a device of the character described, a wheel-overlying rod, having a squared end and cut-away portions (12 and 13) slightly above the end, an axle-engaging collar having an arm, a deflected portion (16), and oppositely extending ears (18 and 19), said ears extending from a portion lying in a plane parallel to the plane of the collar, said ears being bent into tight engagement with the rod within said cut-away portions, and said squared end engaging in the bend between the deflected portion (16) and the ear-carrying portion.

In testimony whereof I hereunto set my hand in the presence of two witnesses.

LULOFF WILSON.

In the presence of—
MARY F. ALLEN,
W. LINN ALLEN.

---

Copies of this patent may be obtained for five cents each, by addressing the "Commissioner of Patents, Washington, D. C."